United States Patent
Chang et al.

(10) Patent No.: US 12,507,685 B1
(45) Date of Patent: Dec. 30, 2025

(54) DISPLAY SYSTEM FOR VISUALIZING FISH STRIKE DATA IN ELECTRIC REELS

(71) Applicant: OKUMA FISHING TACKLE CO. LTD., Taichung (TW)

(72) Inventors: Liang Jen Chang, Taichung (TW); Ke Fan Jeng, Taichung (TW)

(73) Assignee: OKUMA FISHING TACKLE CO. LTD., Taichung (TW)

( * ) Notice: Subject to any disclaimer, the term of this patent is extended or adjusted under 35 U.S.C. 154(b) by 0 days.

(21) Appl. No.: 18/987,007

(22) Filed: Dec. 19, 2024

(51) Int. Cl.
*A01K 97/12* (2006.01)
*A01K 89/012* (2006.01)
*A01K 89/017* (2006.01)

(52) U.S. Cl.
CPC .......... *A01K 97/125* (2013.01); *A01K 89/012* (2013.01); *A01K 89/017* (2013.01)

(58) Field of Classification Search
CPC .... A01K 97/125; A01K 89/00; A01K 89/012; A01K 89/017
See application file for complete search history.

(56) References Cited

U.S. PATENT DOCUMENTS

| | | | | |
|---|---|---|---|---|
| 6,126,103 A | * | 10/2000 | Nanbu | A01K 89/015 242/223 |
| 11,528,897 B1 | * | 12/2022 | McFadyen | G01L 5/10 |
| 2005/0133650 A1 | * | 6/2005 | Stiner | G01G 19/60 242/223 |
| 2010/0000143 A1 | * | 1/2010 | Pekin | A01K 97/125 242/316 |

FOREIGN PATENT DOCUMENTS

KR 101527818 B1 * 6/2015

* cited by examiner

*Primary Examiner* — Richard G Davis
(74) *Attorney, Agent, or Firm* — MUNCY, GEISSLER, OLDS & LOWE, P.C.

(57) ABSTRACT

A display system for visualizing fish strike data in electric reels, comprising a rotation speed detection unit configured to determine the line speed of a fishing line, a current detection unit and a voltage detection unit configured to detect system current and voltage values, and a memory unit configured to store a rotation speed relationship table and a power relationship table. A coefficient calculation unit substitutes the detected values into respective relationship tables to calculate a line speed coefficient and a power coefficient, which are then integrated by a fish strike data calculation unit to calculate fish strike data, with the fish strike data being visualized on a display device.

6 Claims, 7 Drawing Sheets

DISPLAY SYSTEM FOR VISUALIZING FISH
STRIKE DATA IN ELECTRIC REELS

FIELD OF INVENTION

The present invention relates to display systems and more particularly to a system for visualizing fish strike data in electric reels.

BACKGROUND OF THE INVENTION

Conventional fishing rods are equipped with reels for releasing and reeling in fishing lines to assist anglers in deploying bait and retrieving hooked fish. These reels are typically divided into manual and electric types. The electric reels, which are powered by motors, drive the spool to retrieve fishing lines, thereby reducing retrieval time and assisting the anglers during fish fights.

When fighting fish, the anglers traditionally rely on their experience to sense the pull of a fish by touch. They adjust the retrieval speed and counterforce by interpreting the sound of the motor. However, the existing electric reels lack the ability to detect and graphically display the fish pulling force. As a result, the anglers cannot intuitively understand the fish's exertion, which can lead to misjudgements and missed opportunities for optimal retrieval timing, while the lack of visual feedback also reduces the overall enjoyment of fishing.

SUMMARY OF THE INVENTION

The main purpose of the present invention is to provide a display system for visualizing fish strike data in electric reels. This system graphically represents the forces exerted during a fish fight, enabling anglers to intuitively assess the fish's fighting status, optimize the timing of line retrieval, and enjoy enhanced visual engagement, thereby improving the overall fishing experience.

In order to achieve this purpose, the present invention provides a display system for visualizing fish strike data in electric reels, comprising:

A rotation speed detection unit, configured to detect the rotation speed of a spool per unit of time and to determine the speed of the fishing line during retrieval or release from the spool;

A current detection unit, configured to measure the operating current of the system;

A voltage detection unit, configured to measure the operating voltage of the system;

A memory unit, pre-storing a rotation speed relationship table and a power relationship table;

A coefficient calculation unit, configured to substitute the detected spool rotation speed into the rotation speed relationship table to calculate a line speed coefficient; to substitute the detected current and voltage values into the power relationship table to calculate a power coefficient; and then to store the calculated line speed coefficient and the power coefficient in the memory unit; and A fish strike data calculation unit, configured to integrate the line speed coefficient and the power coefficient to calculate fish strike data, and then generate a visualized result based on the calculated fish strike data for display on a display device to intuitively represent the fish's fighting force.

Wherein, the rotation speed relationship table defines a fish explosive power exerted on the system by setting the line speed and the line speed coefficient as the X and Y axes, respectively. The table uses a first reference value corresponding to a zero line speed as a baseline. When the line speed increases from zero in the positive direction (spool retrieval), it is represented as a first fish explosive power function on the X-Y coordinates, where the line speed coefficient gradually decreases but remains greater than zero. When the line speed increases from zero in the negative direction (spool release), it is represented as a second fish explosive power function on the X-Y coordinates, where the line speed coefficient gradually increases, and the tangent slope of the first fish explosive power function is less than that of the second fish explosive power function.

Wherein, the power relationship table defines the fish pulling force exerted on the system by setting the power and the power coefficient as the X and Y axes, respectively. The power is calculated based on the detected current and voltage values starting from zero and increasing positively, while the power coefficient starts from a value greater than zero. A critical power value divides the power range into a first region from zero to the critical power value represented by a first fish pulling force function, and a second region from the critical power value onward to higher power levels represented by a second fish pulling force function, and the tangent slope of the first fish pulling force function is greater than that of the second fish pulling force function.

DETAILED DESCRIPTION OF THE
PREFERRED EMBODIMENTS

Referring to FIGS. 1 to 7, the display system for visualizing fish strike data in electric reels according to a preferred embodiment of the present invention, comprises: a rotation speed detection unit 1, a current detection unit 2, a voltage detection unit 3, a memory unit 4, a coefficient calculation unit 5, a fish strike data calculation unit 6, and a display device 7. When the electric reel is engaged via a clutch and maintained in an inactive state, the coefficient calculation unit 5 calculates the water depth value of the fishing line based on the spool rotation speed during line release, and this water depth value is displayed on the display device 7. Simultaneously, the current detection unit 2 and the voltage detection unit 3 monitor the real-time voltage and current changes of the electric reel and store the detected data in the memory unit 4. The coefficient calculation unit 5 and the fish strike data calculation unit 6 then process this stored data by substituting it into appropriate relationship tables to perform instant calculations as required.

Figure 1:
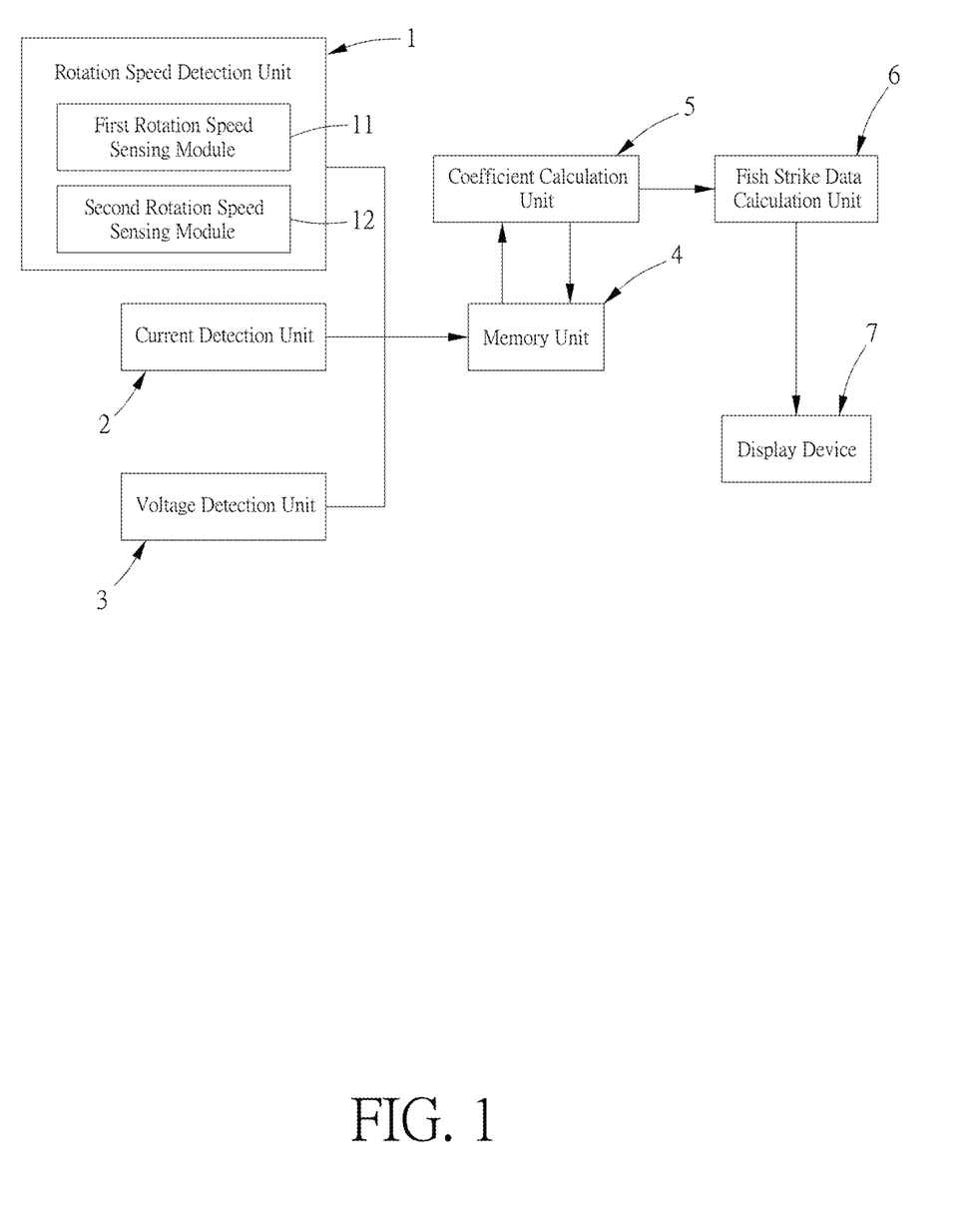
FIG. 1 is a system block diagram showing the components and structure of the present invention.
Figure 2:
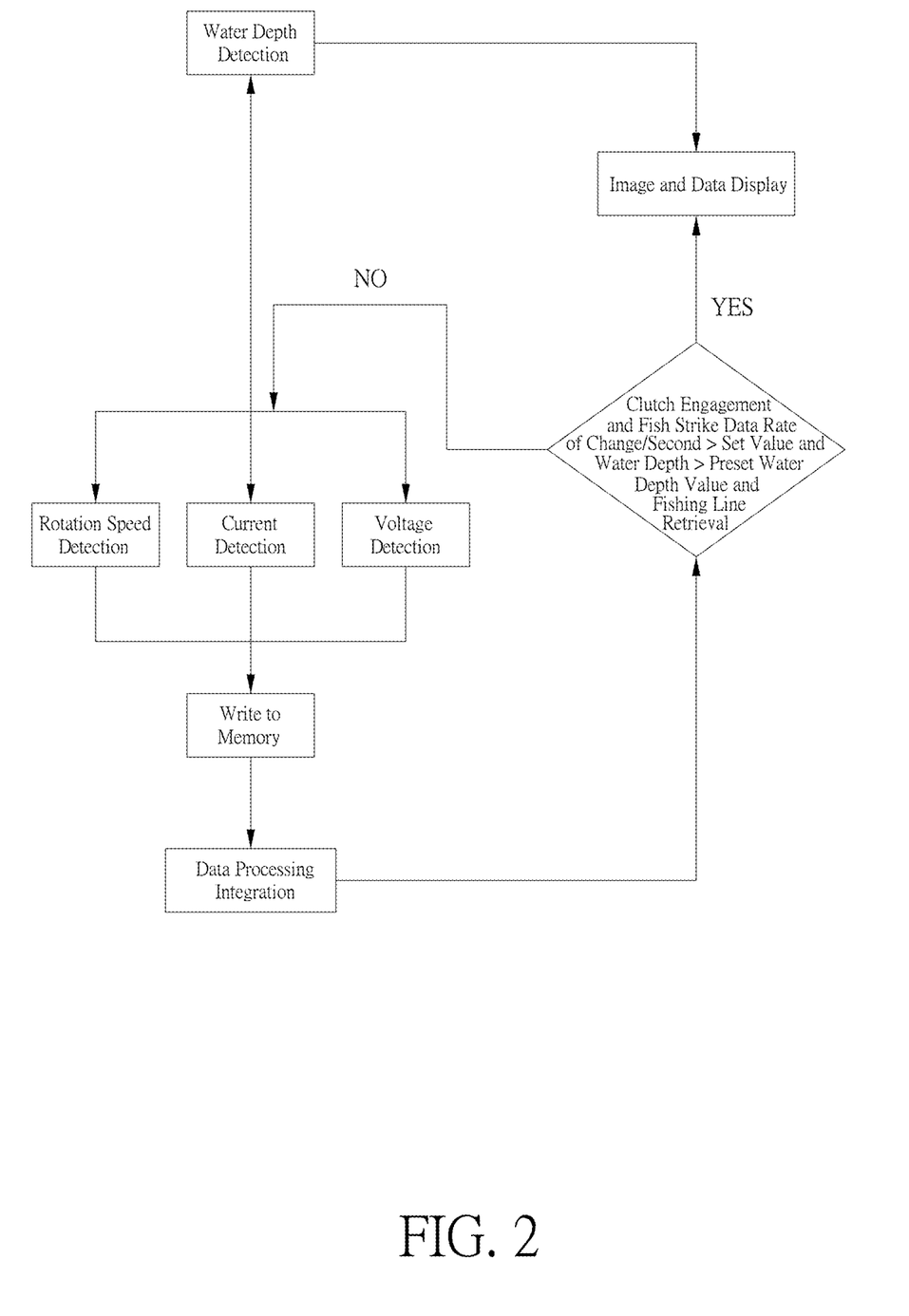
FIG. 2 is a flowchart showing the image display process of the present invention.

Referring to FIGS. 1 and 2, the rotation speed detection unit 1 includes a first rotation speed sensing module 11 and a second rotation speed sensing module 12. These modules determine the rotation direction of a spool and detect its rotation speed per unit of time. When the spool rotation sequentially triggers the first rotation speed sensing module 11 followed by the second rotation speed sensing module 12, the spool is rotating clockwise, indicating that the line is being retrieved. Conversely, when the spool rotation sequentially triggers the second rotation speed sensing module 12 followed by the first rotation speed sensing module 11, the spool is rotating counterclockwise, indicating the line release. The line speed relationship of the fishing line is calculated by multiplying the radial position of the fishing line on the spool with the spool rotation speed, thereby determining the line speed during retrieval or release. The current detection unit 2 and voltage detection unit 3 detect the current and voltage values required for the line retrieval or release during system operation and store this data in the memory unit 4 for further processing.

Figure 3:
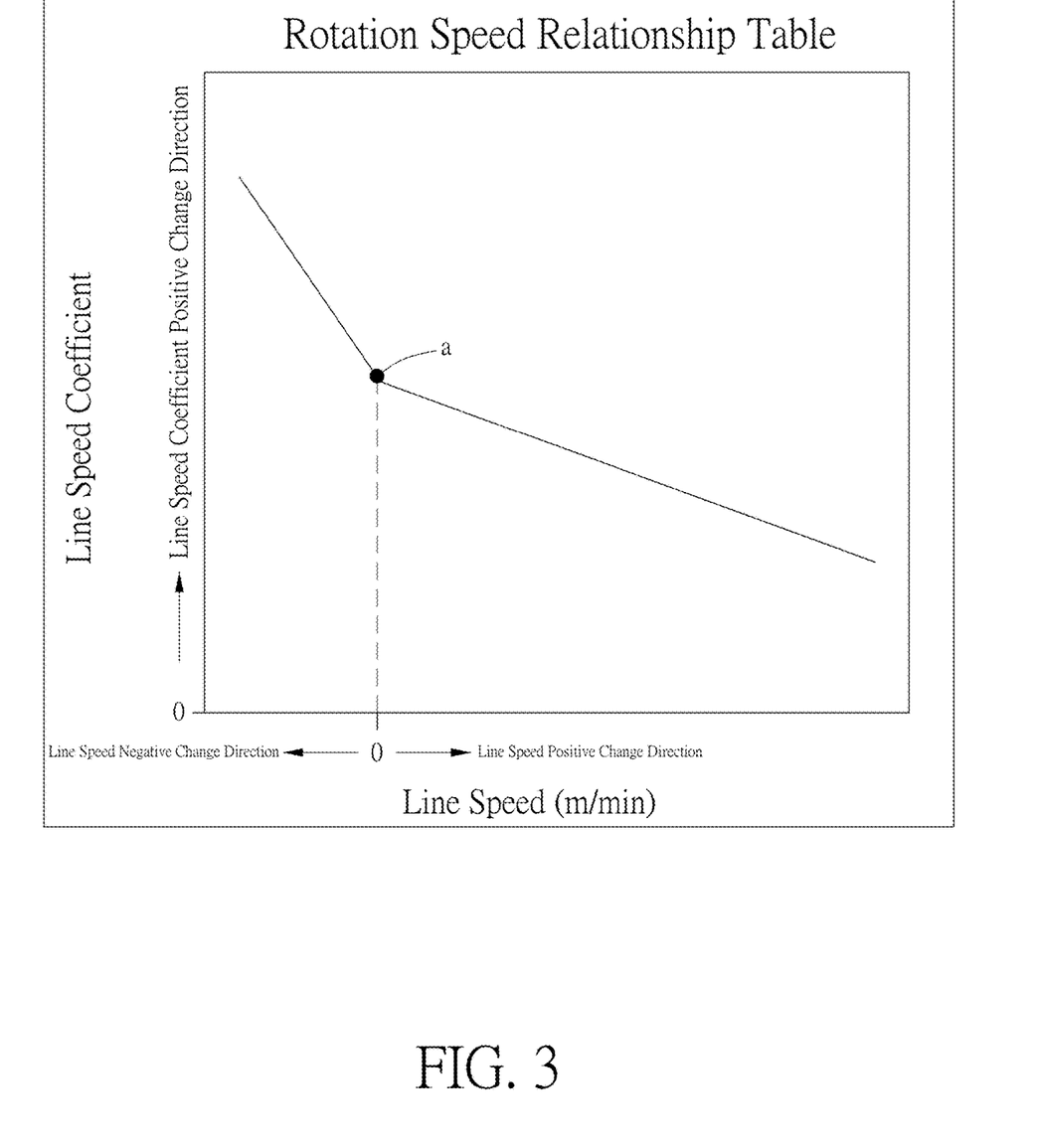
FIG. 3 is a diagram showing the rotation speed relationship table used in the present invention.
Figure 4:
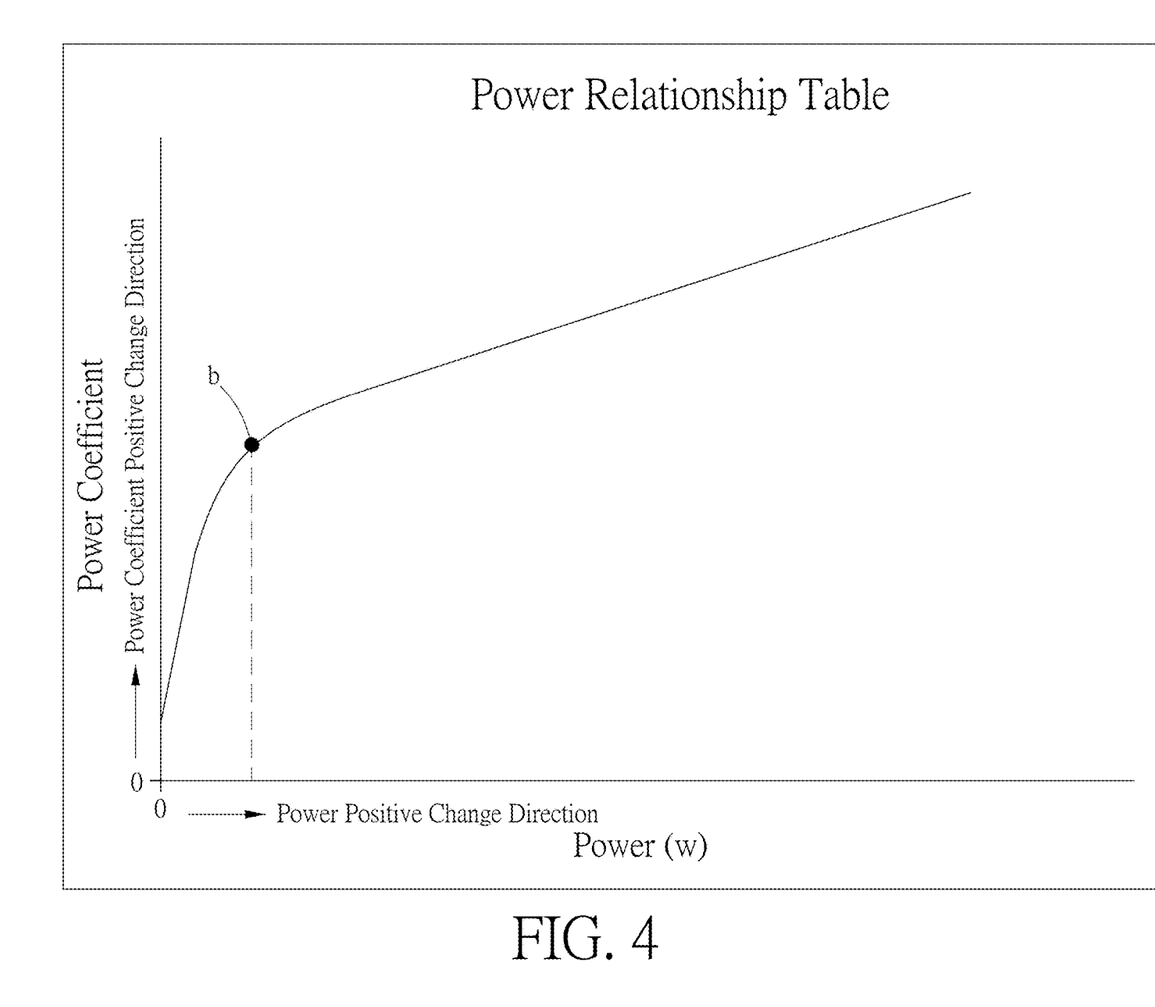
FIG. 4 is a diagram showing the power relationship table used in the present invention.

The memory unit 4 pre-stores a rotation speed relationship table as shown in FIG. 3, and a power relationship table as shown in FIG. 4. The rotation speed relationship table represents an explosive power exerted on the system by the fish. It uses the line speed and line speed coefficient as the X and Y axes, respectively, and establishes a first reference value a as the baseline. The first reference value a corresponds to a state of zero line speed, which indicates the condition where either the fish pulling force is equal to the system force, or the fish exerts no force on the fish hook. When the line speed increases from zero in a positive direction, it indicates the line retrieval, where the fishing line is being wound onto the spool. In this scenario, the fish explosive power exerted on the system is less than the retrieval force, and the corresponding line speed coefficient gradually decreases but remains greater than zero, forming a first fish explosive power function on the X-Y coordinates.

Conversely, when the line speed increases from zero in a negative direction, it indicates the line release, where the fishing line is being unwound from the spool. Here, the fish explosive power exerted on the system exceeds the retrieval force and the corresponding line speed coefficient gradually increases, forming a second fish explosive power function on the X-Y coordinates. The tangent slope value of the first fish explosive power function is less than that of the second fish explosive power function, indicating that in the same speed variation interval, the line speed coefficient associated with the second fish explosive power function is greater than that of the first fish explosive power function.

Referring to FIG. 4, the power relationship table represents the fish pulling force exerted on the system. It uses power and power coefficient as the X and Y axes, respectively. The power is calculated based on the operating current and voltage values of the system starting from zero and increasing positively, while the power coefficient starts from values greater than zero. A critical power value divides the power range into a first region from zero to the critical power value represented by a first fish pulling force function, and a second region from the critical power value onward to higher power levels represented by a second fish pulling force function, and the tangent slope of the first fish pulling force function is greater than that of the second fish pulling force function. Specifically, the first fish pulling force function corresponds to the condition when the fish first takes the hook and starts pulling against the system. During this phase, the fish pulling force significantly exceeds the system's counterforce, requiring a rapid increase in system power to counterbalance the force. As a result, the tangent slope of the first fish pulling force function is larger. When the system's counterforce and fish pulling force gradually approach balance, the power changes become more gradual, resulting in a less steep tangent slope compared to the first fish pulling force function.

Next, the coefficient calculation unit 5 processes the data based on the measured line speed, current value, and voltage value. When the clutch is engaged, it substitutes the detected spool rotation speed into the rotation speed relationship table to calculate a line speed coefficient. It also multiplies the detected current and voltage values to calculate the power, which is then substituted into the power relationship table to determine a power coefficient. The calculated line speed coefficient and power coefficient are then stored in the memory unit 4.

Figure 5:
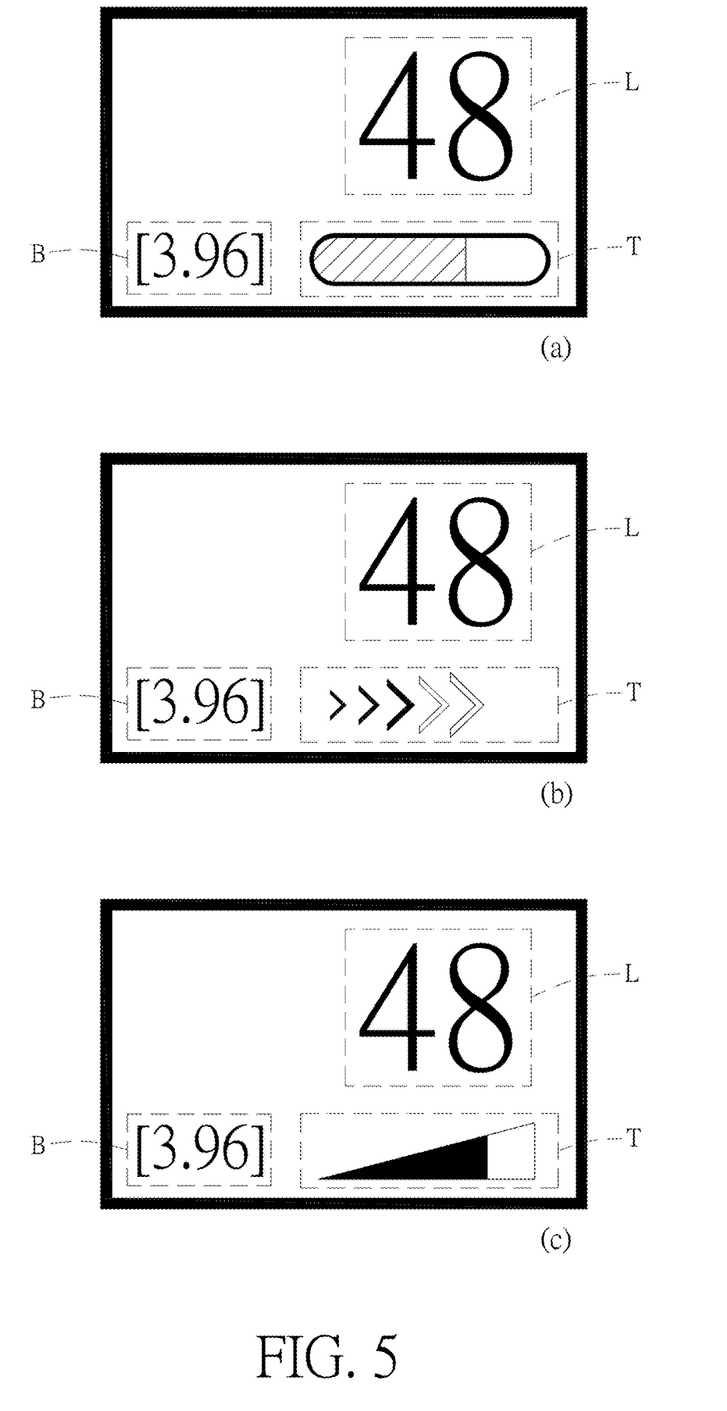
FIG. 5 is a display interface diagram of the display device of the present invention.

Finally, the fish strike data calculation unit 6 integrates the line speed coefficient and power coefficient according to formula (1): Fish strike data=power coefficient×line speed coefficient. The system also preset a reference value for the rate of change in the fish strike data per second, configured based on the size and species of the fish. The larger fishes correspond to higher reference values, ensuring timely system response to present dynamic visualizations and enhance the fishing experience. At this time, the system evaluates the following display conditions: (1) the clutch is in an engaged state; (2) the rate of change of fish strike data per second exceeds a preset reference value; (3) the water depth value of the fishing line exceeds a preset depth value; and (4) the fishing line is being retrieved by the spool. When all these conditions are met simultaneously, the fish strike data calculation unit integrates the calculated fish strike data into a visualized result and a numerical value, and both of which are displayed on the display device 7. The numerical value represents the specific fish strike data, while the visualized result is shown as a dynamic graph T on the display device 7. Preferably, the dynamic graph is a bar graph, as shown in FIG. 5($a$). Alternatively, the fish strike data can be represented as a dynamically progressive arrow, or as a dynamically modulating right-angled triangular profile, as shown in FIGS. 5($b$) and 5($c$), which dynamically illustrate the fishing data dynamically to provide the angler with an intuitive understanding of the fighting strength of the fish.

Figure 6:
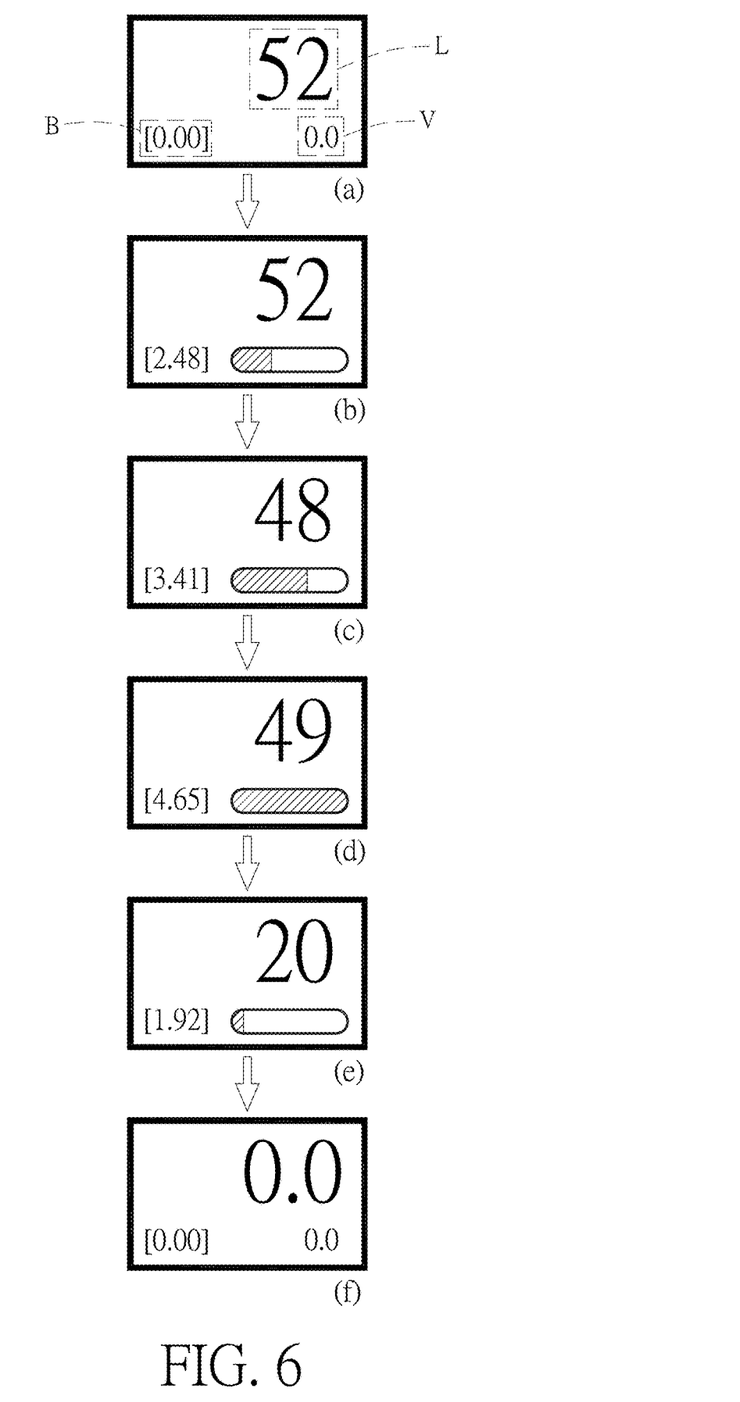
FIG. 6 is a diagram showing the interface image changes on the display device during operation of the present invention.
Figure 7:
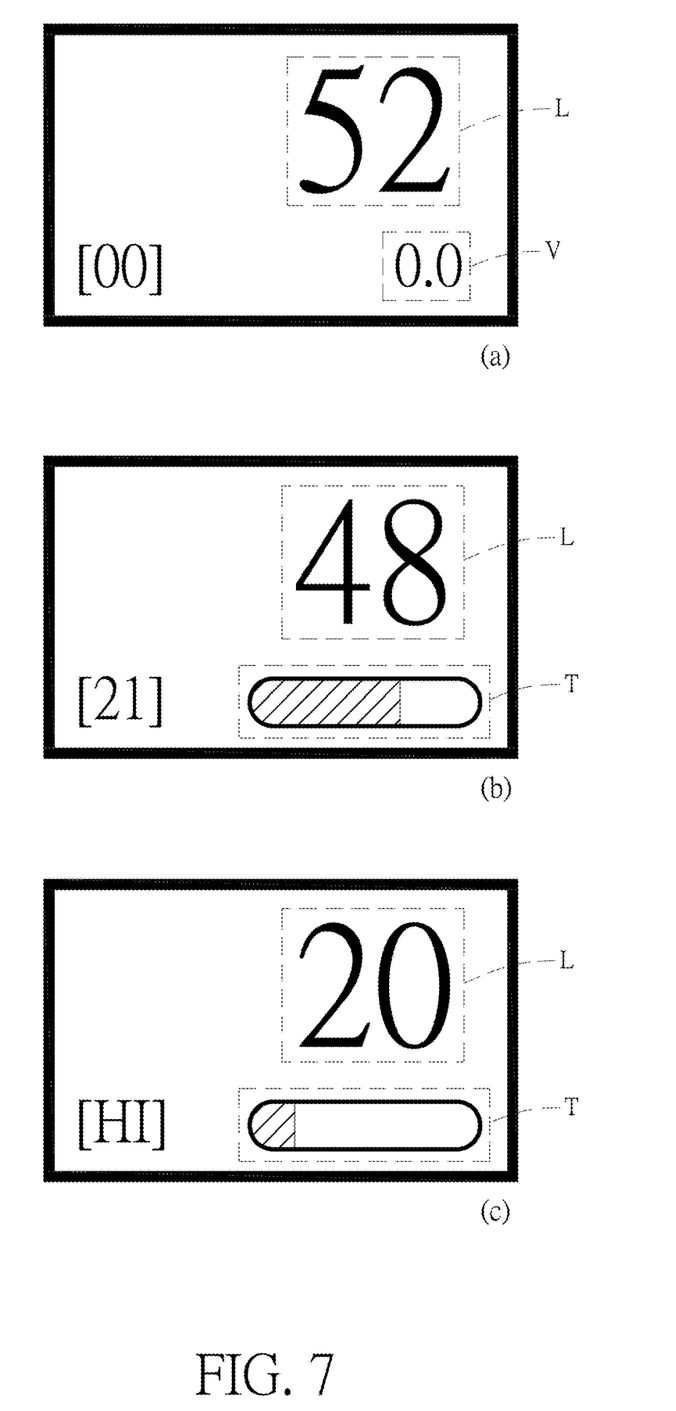
FIG. 7 is an alternative display interface diagram showing another possible layout of the display device of the present invention.

The display interface of the display device 7 is shown in FIG. 6, where FIG. 6($a$) shows an initial state displaying the water depth value L, the current line speed V, and the fish strike data B. When the aforementioned display conditions are satisfied, the display interface of the display device transitions to the state shown in FIG. 6($b$), in which the water depth value L, the fish strike data B, and the dynamic graph T are displayed.

In this embodiment, the electric reel incorporating the display system of the present invention was tested. Based on the measured power (W) and corresponding power coefficients, the power relationship table shown in FIG. 4 was generated. Using the critical power value b to divide the power relationship table into the first fish pulling force function $W'=0.6283 \ln(W)+0.4357$ and the second fish pulling force function $W'=1.617 \ln(W)-4.6317$, where $W'$ represents the power coefficient and W represents power (W). Specifically, these functions have been derived based on the power relationship table obtained during testing in this embodiment and are not intended to restrict the functional relationship between the power and the power coefficient within the scope of the present invention. The power relationship tables for other embodiments follow the functional variation trends shown in FIG. 4.

Similarly, based on the measured line speed (in m/min) and the corresponding line speed coefficients as determined by the direction of rotation of the spool, the rotation speed relationship table shown in FIG. 3 was generated. When the spool is releasing the line, the first fish explosive power function is expressed as V'=−0.02V+1.3. When the spool is retrieving the line, the second fish explosive power function is expressed as V'=−0.0046V+1.257, where V represents line speed (m/min) and V' represents the line speed coefficient for both the first and second fish explosive power functions. Specifically, these functions have been derived based on the rotation speed relationship table obtained during testing in this embodiment and are not intended to restrict the functional relationship between the line speed and the line speed coefficient within the scope of the present invention. The rotation speed relationship tables for other embodiments follow the functional variation trends shown in FIG. 3.

The above rotation speed relationship table, power relationship table, and their corresponding functions are stored in the memory unit. Different set values are configured based on various fish species in the fishing waters. In this embodiment, the set value for the rate of change of fish strike data per second is 1. In other feasible embodiments, the set value can be preset to 2. The conditions required for the display device to show visualized results are as follows:

(1) The clutch is in an engaged state;
(2) The rate of change of the fish strike data per second exceeds a set value;
(3) The water depth value of the fishing line exceeds a preset water depth value; and
(4) The fishing line is being retrieved by the spool.

Referring to FIGS. 1 to 6, this embodiment is further illustrated through a practical application scenario as follows:

Initial State: The fish has not taken the hook, the clutch is engaged, and the spool remains stationary, i.e. the electric reel is inactive. At this point, the power is 0 and the line speed is 0. According to the initial state of this embodiment, the power coefficient W' is 0.5, and the line speed coefficient V' is 1.3. Based on formula (1) above, the fish strike data=W'×V'=0.65 is stored into the memory unit 4. Since the system does not meet the display conditions at this stage, the display device does not show any visualized results. Instead, as shown in FIG. 6(a), the display interface only displays the water depth value L as 52 m, the line speed V as 0.0, and the fish strike data B as 0.00.

Scenario 1: The fish takes the hook and begins to struggle, pulling against the system as the angler starts to retrieve the line.

System Operation: The water depth detection unit 4 detects that the water depth of the fishing line exceeds 1 meter. The rotation speed detection unit 1 determines that the spool sequentially triggers the first rotation speed sensing module 11 and then the second rotation speed sensing module 12, indicating that the spool is rotating clockwise to retrieve the line. The unit also measures the speed of rotation of the spool per unit of time. Using the current detection unit 2 and the voltage detection unit 3, the operating current and voltage values of the system are measured, and using the coefficient calculation unit 5, a line speed of 100 m/min is calculated based on the detected rotation speed and the radial position of the fishing line on the spool. This value is substituted into the rotation speed relationship table to calculate a line speed coefficient V' of 0.8. Simultaneously, the power calculated from the detected current and voltage values is 72 W and is substituted into the power relationship table to calculate a power coefficient W' of 3.1. Both the line speed coefficient and the power coefficient are then stored in the memory unit 4. The fish strike data calculation unit 6 retrieves the stored coefficients and calculates the fish strike data using formula (1): Fish strike data=W'×V'=2.48, with a fish strike data change rate of 1.83, exceeding the preset threshold of 1.

Display Device: Since the display conditions are met, the fish strike data calculation unit integrates the calculated fish strike data into a dynamic graph T as shown in FIG. 6(b). This graph is displayed on the display device 7, simultaneously showing the fish strike data B as 2.48 and the fishing line water depth value L as 52 m.

Scenario 2: The fish's struggle becomes more intense, reaching its maximum pulling force with progressively increasing explosive power. This makes it difficult for the angler to maintain balance, and the line retrieval speed decreases.

System Operation: The rotation speed detection unit 1 detects that the spool continues to rotate clockwise for line retrieval but at a reduced rotation speed per unit of time. As the pulling force of the fish increases, the current detection unit 2 and the voltage detection unit 3 record further increases in the operating current and voltage values of the system. Using the coefficient calculation unit, a line speed of 40 m/min is calculated based on the detected rotation speed and the radial position of the fishing line on the spool. This value is substituted into the rotation speed relationship table to obtain a line speed coefficient V' of 1.1. Simultaneously, a power of 120 W is calculated based on the detected current and voltage values and is substituted into the power relationship table to obtain a power coefficient W' of 3.1. Both the line speed coefficient and the power coefficient are then stored in the memory unit 4. The fish strike data calculation unit 6 retrieves the stored coefficients and calculates the fish strike data using formula (1): Fish strike data=W'×V'=3.41. This fish strike data exceeds the value calculated in Scenario 1, reflecting the increased intensity of the fish's struggle.

Display Device: The fish strike data is integrated and displayed as a dynamic graph T as shown in FIG. 6(c), where the fish strike data B is 3.41 and the line water depth value L is 48 m.

Scenario 3: The fish maintains the maximum pulling force with the even greater explosive power, exceeding the angler's ability to counteract, which prevents line retrieval and results in line release.

System Operation: The rotation speed detection unit 1 detects that the spool sequentially triggers the second rotation speed sensing module 12 and then the first rotation speed sensing module 11, indicating counterclockwise rotation releasing line. The unit also measures the speed of rotation of the spool per unit of time. As the fish maintains maximum pulling force, the detected current and voltage values remain constant. Using the coefficient calculation unit, a line speed of −10 m/min is calculated based on the detected rotation speed and the radial position of the fishing line on the spool. This value is substituted into the rotation speed relationship table to obtain a line speed coefficient V' of 1.5. Simultaneously, a power of 120 W is calculated based on the detected current and voltage values and is substituted into the power relationship table to obtain a power coefficient W' of 3.1. Both the line speed coefficient and the power coefficient are then stored in the memory unit 4. The fish strike data calculation unit 6 retrieves the stored coefficients and calculates the fish strike data using formula (1): Fish strike data=W'×V'=4.65. This increased fish strike data reflects the greater fighting power of the fish during line release.

Display Device: The fish strike data is integrated and displayed as a dynamic graph T as shown in FIG. 6(d), where the fish strike data B is 4.65 and the line water depth value L is 49 m.

Scenario 4: After a prolonged fight, the fish becomes fatigued, significantly reducing its pulling force, which allows for rapid line retrieval.

System Operation: The rotation speed detection unit 1 determines that the spool sequentially triggers the first rotation speed sensing module 11 and then the second rotation speed sensing module 12, indicating that the spool is rotating clockwise to retrieve the line. The unit also measures the speed of rotation of the spool per unit of time. Using the current detection unit 2 and the voltage detection unit 3, the operating current and voltage values of the system are measured, and using the coefficient calculation unit 5, a line speed of 100 m/min is calculated based on the detected rotation speed and the radial position of the fishing line on the spool. This value is substituted into the rotation speed relationship table to calculate a line speed coefficient of 0.8. Simultaneously, the power calculated from the detected current and voltage values is 24 W and is substituted into the power relationship table to calculate a power coefficient of 2.4. Both the line speed coefficient and the power coefficient are then stored in the memory unit 4. The fish strike data calculation unit 6 retrieves the stored coefficients and calculates the fish strike data using formula (1): Fish strike data=2.4×0.8=1.92.

Display Device: The fish strike data is integrated and displayed as a dynamic graph T as shown in FIG. 6(e), where the fish strike data B is 1.92 and the line water depth value L is 20 m.

Final State: After the fish is landed, the pulling force on the system ceases and the clutch is disengaged. As shown in FIG. 6(f), the display device shows all values returning to zero, including the dynamic graph T, the fish strike data B, the water depth value L, and the line speed V.

The above illustrates the functionality of the display system for visualizing fish strike data in electric reels as provided by the present invention. The system collects the variation data during fish fights through the rotation speed detection unit 1, the current detection unit 2, and the voltage detection unit 3, stores them in the memory unit 4 and converts them into the rotation speed relationship table and the power relationship table representing the fish explosive power and the fish pulling force, respectively. The coefficient calculation unit 5 calculates the line speed coefficient and the power coefficient based on these tables, then the fish strike data calculation unit 6 integrates these coefficients to calculate the fish strike data, which is displayed as a dynamic bar graph on the display device 7 as a visualized result, and the system displays different dynamic graphs to reflect changes in the fish pulling force and the fish explosive power. The present invention enables the angler to intuitively understand the status of the fish during a fish fight, thus preventing missed opportunities for optimal line retrieval timing. Beyond the tactile sensation of pulling against the fish and the auditory stimulation of the reel's retrieval sound, the dynamic visualization of fish strike data provides an additional layer of visual stimulation. This greatly enhances the overall fishing experience.

What is claimed is:

1. A display system for visualizing fish strike data in electric reels, comprising:

a rotation speed detection unit, configured to detect the rotation speed of a spool per unit of time to determine the line speed of a fishing line during retrieval or release from the spool;

a current detection unit, configured to detect the operating current value of the system;

a voltage detection unit, configured to detect the operating voltage value of the system;

a memory unit, pre-storing a rotation speed relationship table and a power relationship table;

a coefficient calculation unit, configured to substitute the detected spool rotation speed into the rotation speed relationship table to calculate a line speed coefficient, and to substitute the detected current value and voltage value into the power relationship table to calculate a power coefficient, then to store the calculated line speed coefficient and power coefficient in the memory unit; and a fish strike data calculation unit, configured to integrate the line speed coefficient and the power coefficient to calculate fish strike data, and then generate a visualized result based on the calculated fish strike data for display on a display device to intuitively represent the fish's fighting force;

wherein the rotation speed relationship table defines the fish explosive power exerted on the system by setting the line speed and the line speed coefficient as the X and Y axes, respectively, using a first reference value corresponding to a zero line speed state as a baseline, which indicates the condition where the fish pulling force equals the system force; when the line speed increases from zero in the positive direction representing spool line retrieval, it is represented as a first fish explosive power function on the X-Y coordinates, where the line speed coefficient gradually decreases but remains greater than zero; when the line speed increases from zero in the negative direction representing spool line release, it is represented as a second fish explosive power function on the X-Y coordinates, where the line speed coefficient gradually increases, and the tangent slope of the first fish explosive power function is less than that of the second fish explosive power function;

and wherein the power relationship table defines the fish pulling force exerted on the system by setting the power and the power coefficient as the X and Y axes, respectively, with the power calculated based on the detected current value and voltage value starting from zero and increasing positively, and the power coefficient starting at a value greater than zero, and wherein a critical power value divides the power range into a first region from zero to the critical power value represented by a first fish pulling force function, and a second region from the critical power value onward to higher power levels represented by a second fish pulling force function, with the tangent slope of the first fish pulling force function being greater than that of the second fish pulling force function.

2. The display system for visualizing fish strike data in electric reels according to claim 1, wherein the fish strike data is displayed as a dynamic graph and a numerical value, with the length of the dynamic graph being proportional to the magnitude of the fish strike data, and the numerical value indicating the specific value of the fish strike data.

3. The display system for visualizing fish strike data in electric reels according to claim 1, wherein the rotation speed detection unit comprises a first rotation speed sensing module and a second rotation speed sensing module for determining the direction of spool rotation, wherein sequential triggering of the first rotation speed sensing module followed by the second rotation speed sensing module indicates clockwise rotation, and sequential triggering of the second rotation speed sensing module followed by the first rotation speed sensing module indicates counterclockwise rotation, with the line speed relationship being determined by multiplying the radial position of the fishing line on the spool with the spool rotation speed.

4. The display system for visualizing fish strike data in electric reels according to claim 1, wherein when the rate of change of the fish strike data per second exceeds a preset value, the visualized result of the fish strike data is displayed on the display device.

5. The display system for visualizing fish strike data in electric reels according to claim 4, wherein when the rate of change of the fish strike data per second exceeds 2, the visualized result of the fish strike data is displayed on the display device.

6. The display system for visualizing fish strike data in electric reels according to claim 4, wherein when the monitored water depth value of the fishing line in the water exceeds a preset water depth value and the fishing line begins to be retrieved by the spool, the visualized result of the fish strike data is displayed on the display device.

\* \* \* \* \*